United States Patent [19]
Tanase

[11] Patent Number: 5,990,723
[45] Date of Patent: Nov. 23, 1999

[54] FILTER CIRCUITS FOR PROTECTING AGAINST TRANSIENT ELECTRICAL PULSES

[75] Inventor: Gabriel E. Tanase, Cupertino, Calif.

[73] Assignee: Maxim Integrated Products, Inc., Sunnyvale, Calif.

[21] Appl. No.: 09/004,952

[22] Filed: Jan. 9, 1998

[51] Int. Cl.[6] .................................................. H03K 5/08
[52] U.S. Cl. ....................... 327/313; 327/327; 323/901; 361/13
[58] Field of Search .................................... 327/309, 310, 327/311, 313, 327, 545, 546; 363/49, 50; 323/901, 908; 361/13

[56] References Cited

U.S. PATENT DOCUMENTS

| | | | |
|---|---|---|---|
| 4,821,096 | 4/1989 | Maloney | 357/23.13 |
| 4,855,647 | 8/1989 | Schaller et al. | 315/209 R |
| 4,900,951 | 2/1990 | Saito et al. . | |
| 5,155,648 | 10/1992 | Gauthier . | |
| 5,243,232 | 9/1993 | Bolda et al. | 327/545 |
| 5,347,185 | 9/1994 | Tailliet | 327/326 |
| 5,392,186 | 2/1995 | Alexander et al. | 361/92 |
| 5,438,213 | 8/1995 | Tailliet | 257/360 |
| 5,440,162 | 8/1995 | Worley et al. | 257/355 |
| 5,504,362 | 4/1996 | Pelella et al. | 257/357 |
| 5,508,548 | 4/1996 | Tailliet | 257/360 |
| 5,587,685 | 12/1996 | Johansson . | |
| 5,744,842 | 4/1998 | Ker | 257/362 |
| 5,754,074 | 5/1998 | Kelly | 327/437 |

OTHER PUBLICATIONS

Duvvury, et al., ESD Design Considerations for ULSI, 1985, presented at the EOS/ESD Symposium.

Hu, et al., Hot–Electron–Induced MOSFET Degradation Model, Monitor, and Improvement, Feb. 1985, IEEE Transactions on Electron Devices, vol. ED 32, No. 2, pp. 375–385.

Gadi Krieger, Thermal Response of Integraged Circuit Input Devices to an Electrostatic Energy Pulse, Apr. 1987, IEEE Transactions on Electron Devices, vol. ED–34, No. 4, pp. 877–882.

Grinolds, et al., Reliability and Performance of Submicron LDD NMOSFET's with Buried–As n⁻ Impurity Profiles, 1985, IEEE, pp. 246–249.

*Primary Examiner*—Terry D. Cunningham
*Attorney, Agent, or Firm*—Hickman Stephens & Coleman, LLP

[57] ABSTRACT

The present invention teaches a variety of filter circuits for protecting against transient electrical pulses such as those caused by electrostatic discharge (ESD) events. One aspect of the present invention teaches an integrated circuit package having primary circuitry, an ESD protection device, a filter circuit, and a conductive lead arranged to couple a point external to the integrated circuit package to a point internal to the integrated circuit package. The ESD device, coupled in series between the conductive lead and a ground reference, can limit the voltage magnitude of a transient electrical pulse occurring upon the conductive lead. The filter circuit is operable such that the voltage magnitude of an electrical signal generated at the filter circuit output is less than the voltage magnitude of the certain transient electrical pulse itself. One preferred filter circuit has two resistors $R_1$ and $R_2$, two capacitors $C_1$ and $C_2$, and two transistors $Q_1$ and $Q_2$. These components are arranged such the first terminals of resistors R1 and R2 and the collector of transistor Q1 are electrically coupled and constitute the filter circuit input. The second terminal of the resistor R2 and the first terminal of the capacitor C2 are electrically coupled. The second terminal of the capacitor C2 and the base of the transistor Q2 are electrically coupled. The second terminal of the resistor R1, the collector of the transistor Q2, the first terminal of the capacitor C1, and the base of the transistor Q1 are electrically coupled. Finally, the emitter of the transistor Q2 and the second terminal of the capacitor C1 are electrically coupled.

26 Claims, 5 Drawing Sheets

FILTER CIRCUITS FOR PROTECTING AGAINST TRANSIENT ELECTRICAL PULSES

TECHNICAL FIELD

The present invention is related to filter circuits for protecting electrical devices from transient electrical pulses such as those caused by electrostatic discharge (ESD) events. More specifically, the present invention teaches coupling an ESD protection device together with a filter circuit in order to protect the primary electrical circuitry from ESD events which the ESD protection device does not adequately dissipate.

BACKGROUND ART

Electrical devices of all types are susceptible to damage from transient electrical events. The short duration of transient electrical events such as electrostatic discharge (ESD) might make them appear innocuous. However, this is simply not the case.

Take, for example, the high susceptibility of many integrated circuits to ESD events. ESD, as will be appreciated, is the rapid discharge of static electricity from one conductor to another conductor having a different electrical potential. The typical integrated circuit includes a variety of conductors and electrical components that are generally intended to operate near the same potential. Hence, components internal to the integrated circuit are not designed to withstand the rapid discharge of electricity arising during ESD events. However, when a lead of the integrated circuit comes into near contact with a conductor of a different potential (e.g., a human who has been walking over a carpet), an ESD event occurs potentially damaging the integrated circuit.

FIG. 1 provides a schematic useful for describing how an ESD event may arise in connection with an integrated circuit 10 of the prior art. The integrated circuit 10 includes primary circuitry 12, an ESD protection device 14, and an input lead 16 coupled electrically to both the primary circuitry 12 and the ESD protection device 14. The primary circuitry 12 and the ESD protection device 14 are both coupled to a common ground reference 20. An impedance Z1 models the effective impedance between the input lead 16 and an external conductor 30 that is the source of the static electricity.

When the external conductor 30 and the input lead 16 possess different potentials and are brought close enough together, the impedance Z1 is such that an ESD event occurs. The ESD event generates a current $I_{ESD}$ across the impedance Z1 and a voltage $V_{ESD}$ at the external conductor 30 with reference to the common ground 20. The typical ESD event lasts less than 300 nanoseconds, meaning that that the energy has dissipated and both the voltage $V_{ESD}$ and the current $I_{ESD}$ are negligible after this time. However, while the ESD event is occurring, the voltage $V_{ESD}$ and the corresponding $I_{ESD}$ can be exceedingly high. For example, the voltage $V_{ESD}$ from a normal human body discharge can exceed 3 kilo Volts.

Typical ESD protection devices such as ESD protection device 14 operate such that the resulting voltage $V_+$ across the primary circuitry 12 is less than 100 Volts with the bulk of the current $I_{ESD}$ flowing through the ESD protection device 14 rather than the primary circuitry 12. For many integrated circuits, this reduction in applied voltage and the redirection of the current is sufficient protection to safeguard against any possible damage. However, certain integrated circuits are much more sensitive to transient electrical pulses and currently available ESD protection devices are not capable of providing the needed protection.

For example, certain integrated circuits include thin film fuses. These thin film fuses can be selectively blown, even after the integrated circuit has been packaged, in order to produce an integrated circuit having the desired electrical characteristics. This enables the electrical characteristics of the integrated circuit to be modified after the integrated circuit is fully packaged. As will be appreciated, different selections of the fuses result in different electrical characteristics. These thin film fuses are sensitive to voltage spikes and may be inadvertently blown when an ESD event occurs, even when protected by a standard ESD protection device. Once a fuse is improperly blown, the electrical characteristics of the integrated circuit are irreversibly altered.

Accordingly, what is needed is a filter circuit that can work in conjunction with common ESD protection devices to provide enhanced protection from ESD events and other transient electrical events.

DISCLOSURE OF THE INVENTION

In order to achieve the foregoing and in accordance with the present invention, a variety of filter circuits and integrated circuit packages are taught herein. A first filter circuit includes two resistors $R_1$ and $R_2$, two capacitors $C_1$ and $C_2$, and two transistors $Q_1$ and $Q_2$. These components are arranged such that transient voltage pulse applied at an input of the filter circuit is attenuated so that a voltage measured at the emitter of the transistor $Q_1$ (which is the output of the filter circuit) due to the transient voltage pulse is substantially less than the transient voltage pulse.

More specifically, the first terminals of resistors R1 and R2 and the collector of transistor Q1 are electrically coupled and constitute the filter circuit input. The second terminal of the resistor R2 and the first terminal of the capacitor C2 are electrically coupled. The second terminal of the capacitor C2 and the base of the transistor Q2 are electrically coupled. The second terminal of the resistor R1, the collector of the transistor Q2, the first terminal of the capacitor C1, and the base of the transistor Q1 are electrically coupled. Finally, the emitter of the transistor Q2 and the second terminal of the capacitor C1 are electrically coupled.

In order to protect the transistor $Q_2$, another filter circuit of the present invention teaches coupling a resistor $R_3$ between the base of the transistor $Q_2$ and a ground reference. This prevents the voltage at the base of the transistor $Q_2$ from being a "floating" voltage. Likewise, another filter circuit of the present invention teaches coupling a diode connected transistor $Q_3$ between the base of the transistor $Q_2$ and the ground reference. That is, the emitter of the transistor $Q_3$ is coupled to the base of the transistor $Q_2$ and the base and the collector of the transistor $Q_3$ are coupled to the ground reference.

Yet another embodiment of the present invention teaches an integrated circuit package having primary circuitry, an ESD protection device, a filter circuit, and a conductive lead arranged to form a conductive path from a point external to the integrated circuit package to a point internal to the integrated circuit package. The ESD device, coupled in series between the conductive lead and a ground reference, is operable to limit the voltage magnitude of a transient electrical pulse occurring upon the conductive lead. The filter circuit, having an input electrically coupled to the conductive lead and an output electrically coupled to the primary integrated circuit, is operable such that the voltage magnitude of an electrical signal generated at the filter circuit output in response to the certain transient electrical pulse is less than the voltage magnitude of the certain transient electrical pulse itself.

BEST MODES FOR CARRYING OUT THE INVENTION

Figure 2:
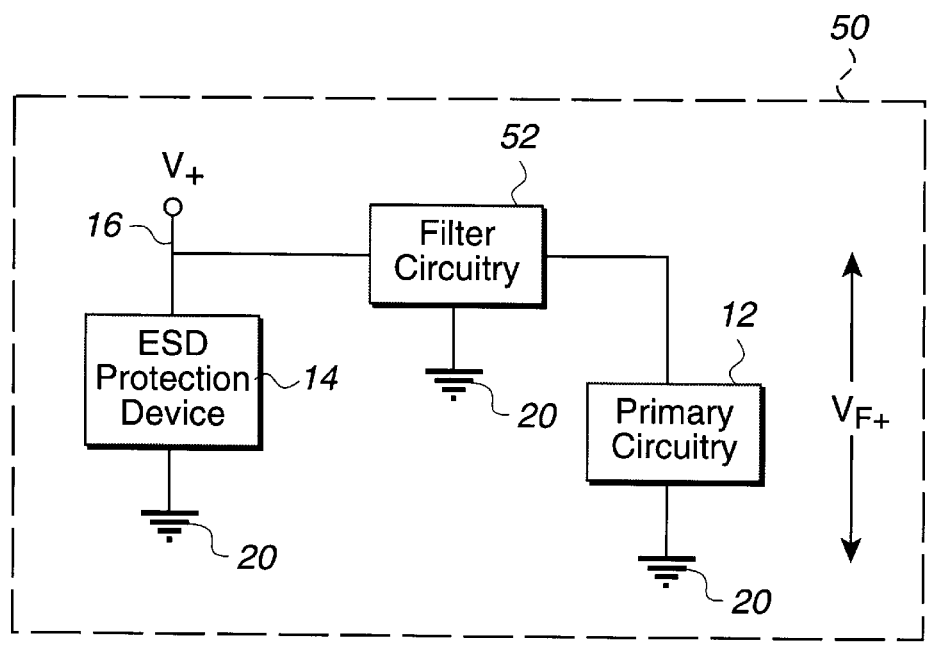
FIG. 2 is a schematic of an integrated circuit including a filter circuit in accordance with one embodiment of the present invention

With reference to FIG. 2, an integrated circuit 100 in accordance with one embodiment of the present invention will now be described. The integrated circuit 100 includes primary circuitry 12, an electrostatic discharge (ESD) protection device 14, a terminal 16, and a filter circuit 102. The ESD protection device 14 is connected in series between the terminal 16 and a common ground reference 20 and serves to limit the voltage $V_+$ generated by a transient electrical pulse. The filter circuit 102 is connected in series between the terminal 16 and the primary circuitry 12.

The filter circuit 102 is designed to filter the voltage $V_+$ such that the primary circuitry 12 is protected from the full magnitude of the voltage $V_+$. Therefore, while a voltage $V_+$ is present at the terminal 16, which is coupled to the ESD protection device 14, the input to the primary circuitry 12 is a filtered voltage $V_{F+}$ generated by the filter circuit 12. Two preferred embodiments of the filter circuit 102 are described in more detail below with reference to FIGS. 3–7.

Figure 3:
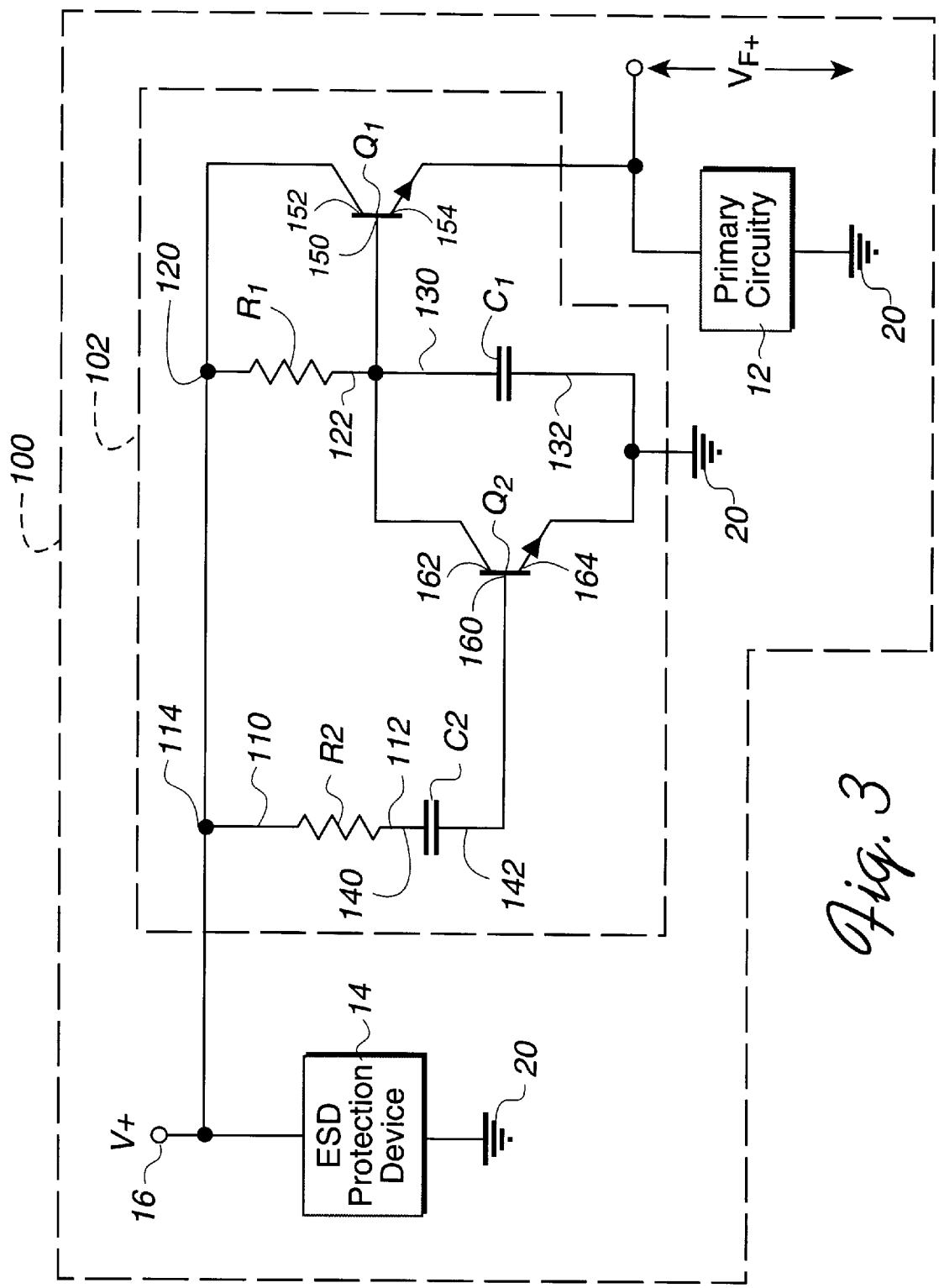
FIG. 3 is a schematic of an integrated circuit including a filter circuit in accordance with another embodiment of the present invention.

Turning next to FIG. 3, a filter circuit 102 in accordance with one particular embodiment of the present invention will now be described. FIG. 3 is a schematic of an integrated circuit 100 including primary circuitry 12, an ESD protection device 14, a terminal 16, and the filter circuit 102. The filter circuit 102 is connected in series between the terminal 16 and the primary circuitry 12. Therefore, while a voltage $V_+$ is present at the terminal 16, which is coupled to the ESD protection device 14, the input to the primary circuitry 12 is a filtered voltage $V_{F+}$ generated by the filter circuit 12.

The filter circuit 102 includes two resistors $R_1$ and $R_2$, two capacitors $C_1$ and $C_2$, and two npn transistors $Q_1$ and $Q_2$. The resistor $R_1$ has terminals 110 and 112 and the resistor $R_2$ has terminals 120 and 122. The capacitor $C_1$ has terminals 130 and 132 and the capacitor $C_2$ has terminals 140 and 142. The transistor $Q_1$ has a base 150, a collector 152, and an emitter 154. The transistor $Q_2$ has a base 160, a collector 162, and an emitter 164. As will be appreciated, transistors such as $Q_1$ and $Q_2$ operate such that a voltage differential between the base and the emitter controls a current flow through the collector and emitter.

The components of the filter circuit 102 are connected as follows. The terminal 110 of the resistor $R_1$, the terminal 120 of the resistor $R_2$, and the collector 152 of the transistor $Q_1$ are electrically coupled together forming an input node 114 of the filter circuit 102. The terminal 140 of the capacitor $C_1$ is electrically coupled to the terminal 112 of the resistor $R_1$ and the terminal 142 of the capacitor $C_1$ is electrically coupled to the base 160 of the transistor $Q_2$. The terminal 122 of the resistor $R_1$, the collector 162 of the transistor $Q_2$, the terminal 130 of the capacitor $C_1$, and the base 150 of the transistor $Q_1$ are electrically coupled. The emitter 164 of the transistor $Q_2$ and the terminal 132 of the capacitor $C_1$ are electrically coupled to the common ground reference 20. The emitter 154 of the transistor $Q_1$ acts as an output of the filter circuit 102 that is electrically coupled to the input of the primary circuitry 12.

Figure 1:
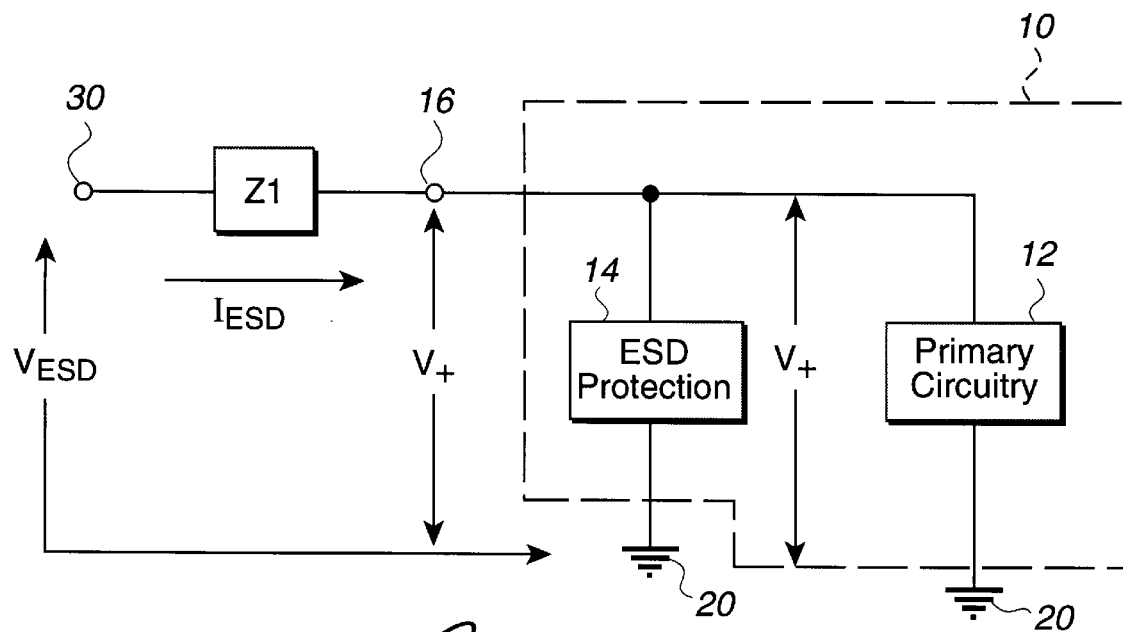
FIG. 1 is a schematic modeling an integrated circuit of the prior art.

As described above with reference to FIG. 1, when an ESD event occurs, the ESD protection device 14 limits the voltage $V_+$ to around, e.g., 50 Volts amplitude and less than 300 nanoseconds in duration. This voltage pulse is practically a "square wave," typically having steep rise and fall edges. For example, the rise and fall times may both be 10 nanoseconds or less. The following description of the operation of the filter circuit 102 is a response to such an ESD event.

Initially, both capacitors $C_1$ and $C_2$ are discharged and transistors $Q_1$ and $Q_2$ are off (i.e., no current is flowing therethrough). On the rising edge of the $V_+$ pulse, the capacitor $C_1$ is charged according to the time constant $t1=R_1*C_1$. Simultaneously, the transistor $Q_1$ turns on due to the voltage transmitted through the capacitor $C_2$ with a dV/dt ramp rate at the base of the transistor $Q_2$. The transistor $Q_2$ is preferably chosen such that its turn on time is short relative to t1 so that the voltage across the charging capacitor $C_1$ is still at a low level when the transistor $Q_2$ turns on. When the transistor $Q_2$ turns on, current flowing across the collector 162/emitter 164 junction serves to discharge the capacitor $C_1$ and the voltage $V_{F+}$ will drop to a low level.

While the preceding was occurring, the initially discharged capacitor $C_2$ has been charging due to the resistor $R_2$ and the input resistance present at the base 160 of the transistor $Q_2$. The time constant $t2=C_2 * (R_1+$ base resistance) determines the time ($3*t2$) when the transistor $Q_2$ will begin turning off. Preferably, a sufficiently lengthy time constant t2 is selected in order to keep $Q_2$ saturated until the $V_+$ input pulse ends.

As the transistor $Q_2$ comes out of saturation, the capacitor $C_1$ begins charging (again) through the resistor $R_1$. Then, on the falling edge of the pulse $V_+$, the voltage $V_{F+}$ rises momentarily as the capacitors $C_1$ and $C_2$ fully discharge.

Designing for a "worst case" scenario upon an integrated circuit might entail dealing with an ESD event resulting in a transient pulse voltage $V_+$ of about 50 Volts with a duration of about 300 nanoseconds. As will be appreciated, larger capacitive values will provide greater protection. Certain embodiments of the present invention are contemplated as integral to the integrated circuit thus making physical dimensions a limiting factor.

Under these circumstances, suitable values for the components are as follows. The capacitor $C_1$ may be between about 2 picofards and 25 picofarads. More preferably, the capacitor $C_1$ is about 15 picofarads. The resistor $R_1$ may be between about 500 ohms and about 10 Kilo ohms. More preferably, the resistor $R_1$ is about 2 Kilo ohms. The time constant t1 should be greater than or equal to about 30 nanoseconds. The capacitor $C_2$ may be between about 5 picofards and 20 picofarads. More preferably, the capacitor $C_2$ is about 8.6 picofarads. The resistor $R_2$ may be between about 1 Kilo ohm and 20 Kilo ohms. More preferably, the resistor $R_2$ is about 5 kilo ohms. Preferably the time constant t2 is greater than 100 nanoseconds. The resultant voltage curves are shown in FIGS. 4 and 5.

Figure 4:
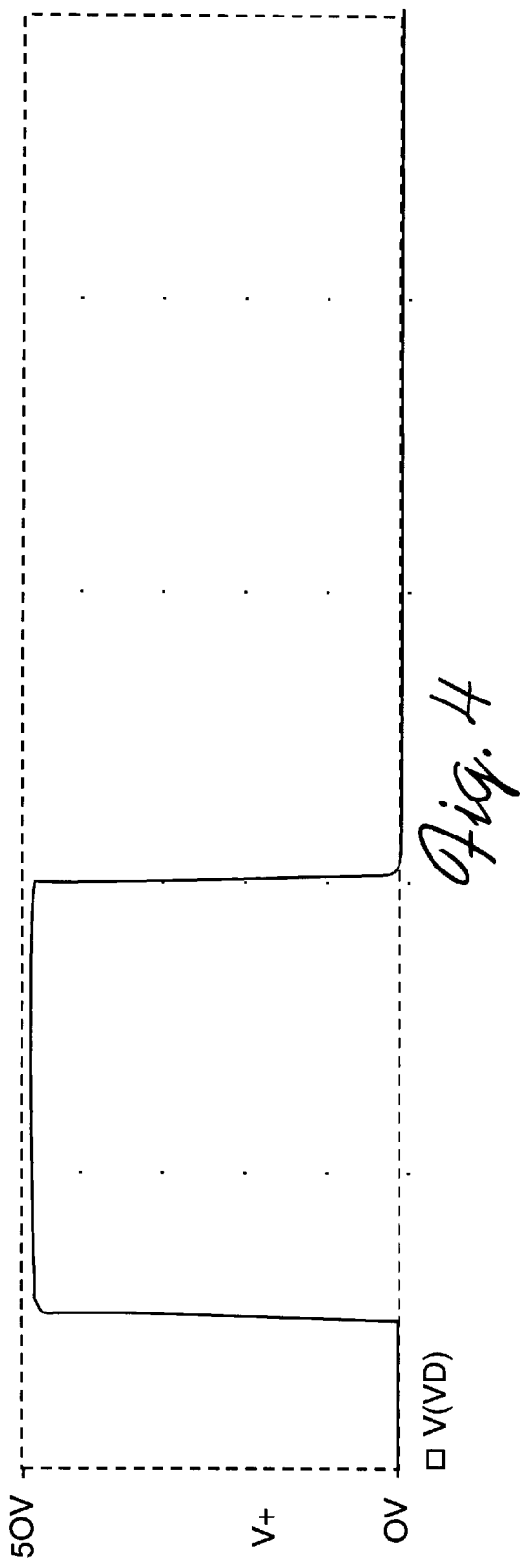
FIG. 4 is a time plot of a voltage $V_+$ resulting from an ESD event voltage $V_{ESD}$ dissipated by a standard ESD device.
Figure 5:
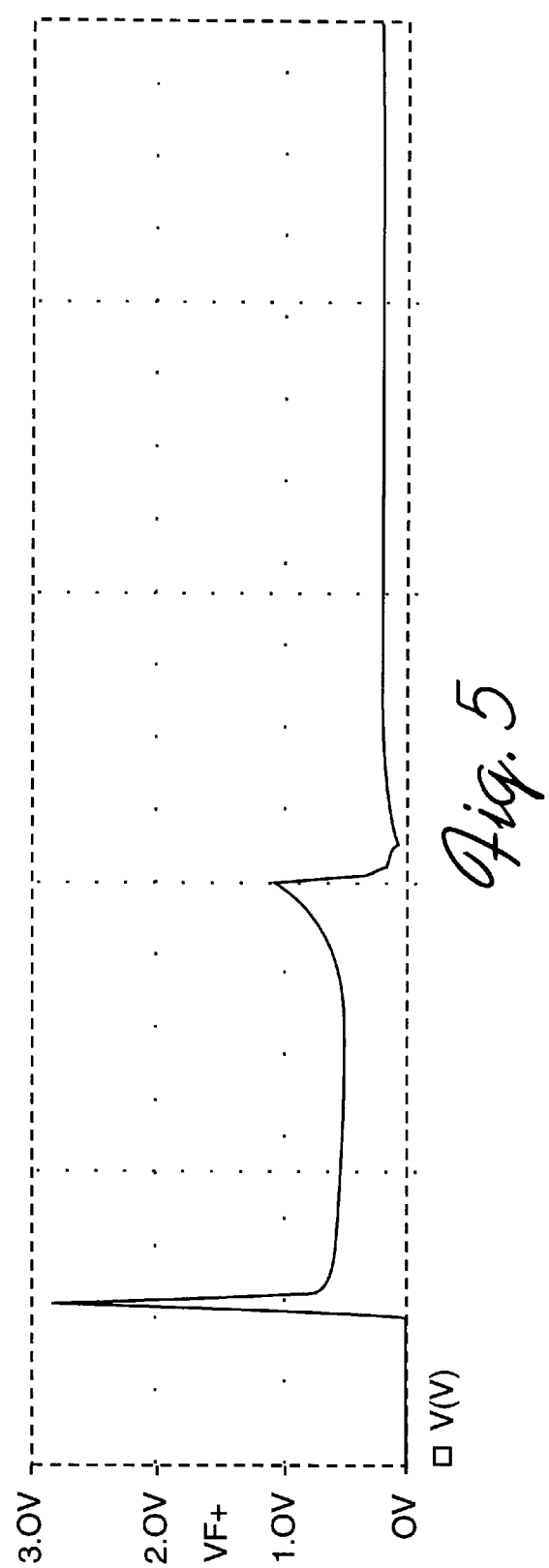
FIG. 5 is a time plot of a filtered voltage $V_{F+}$ resulting from the filter circuit of the present invention operating upon the voltage $V_+$ of FIG. 4.

FIGS. 4 and 5 plot a hypothetical voltage $V_{ESD}$ and a resultant voltage $V_{F+}$, respectively, as functions of time. Note how the filtered voltage $V_{F+}$ has two spikes 200 and 202. The voltage spike 200 peaks at about 3 Volts while the voltage spike 202 peaks at about 1 Volt. In contrast with the 50 Volt pulse of $V_+$, the voltage spikes 200 and 202 are much less likely to cause damage on subsequent circuitry.

Figure 6:
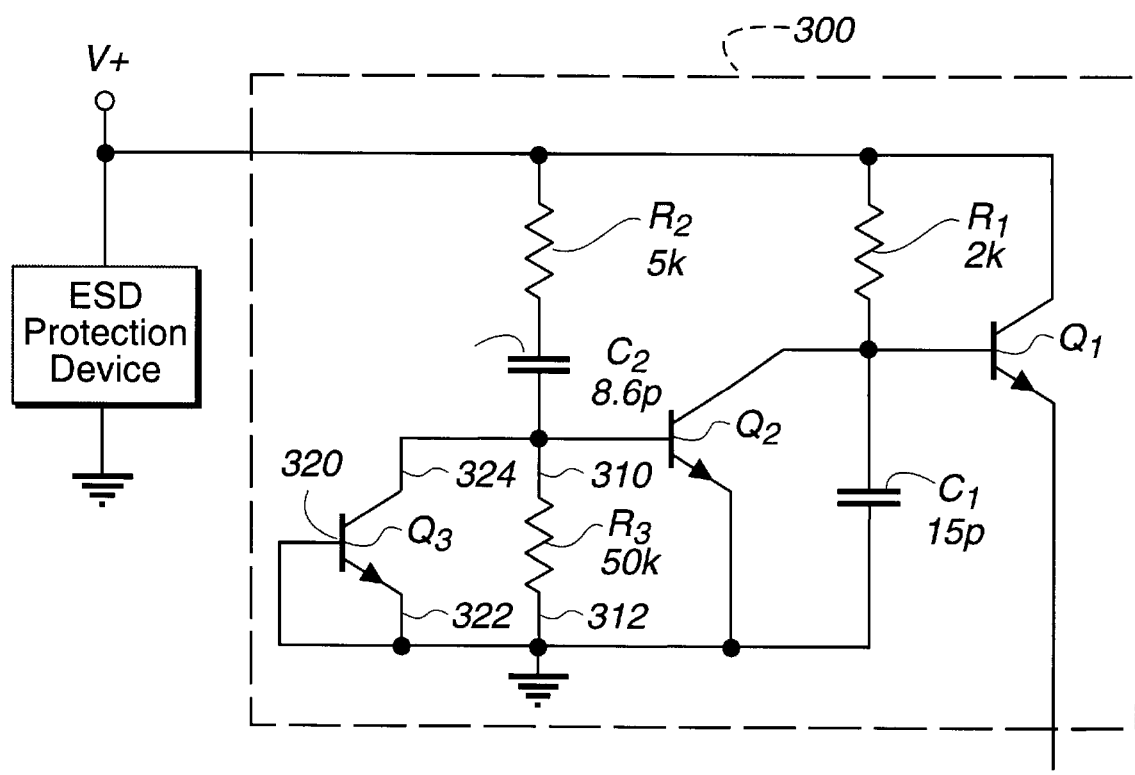
FIG. 6 is a schematic of a second filter circuit in accordance with another embodiment of the present invention.

Turning next to FIG. 6, a filter circuit 300 in accordance with another embodiment of the present invention will now be described. As will be appreciated, the transistor $Q_2$ in filter circuit 102 of FIG. 3 is controlled by a floating voltage applied at its base 160. The filter circuit 300 has filter circuitry similar to filter circuit 102 but further includes a diode connected transistor $Q_3$ and a resistor $R_3$ which as connected provide a coupling to the common ground reference 20. The transistor $Q_3$ and resistor $R_3$ provide protection to the transistor $Q_2$, particularly during transition periods when the voltage at the base 160 may go negative.

The resistor $R_3$ has terminals 310 and 312. Values ranging between about 20 Kilo ohms and 200 Kilo ohms are suitable for the resistor $R_3$. The transistor $Q_3$ has a base 320, a collector 322, and an emitter 324. The emitter 324 of the transistor $Q_3$ and the terminal 310 of the resistor $R_3$ are electrically coupled to the base 160 of the transistor $Q_2$. The base 320 and the collector 322 of the transistor $Q_3$ and the terminal 312 of the resistor 312 are electrically coupled to the common ground reference 20.

Thus when the voltage driving the base 160 of transistor $Q_2$ is negative, the transistor $Q_3$ will conduct a current limited by the resistor $R_2$ and prevent the base-emitter junction of $Q_2$ from voltage breakdown. Further, by coupling the base 160 of transistor $Q_2$ to the ground connected $R_3$, the base 160 is no longer floating.

Figure 7:
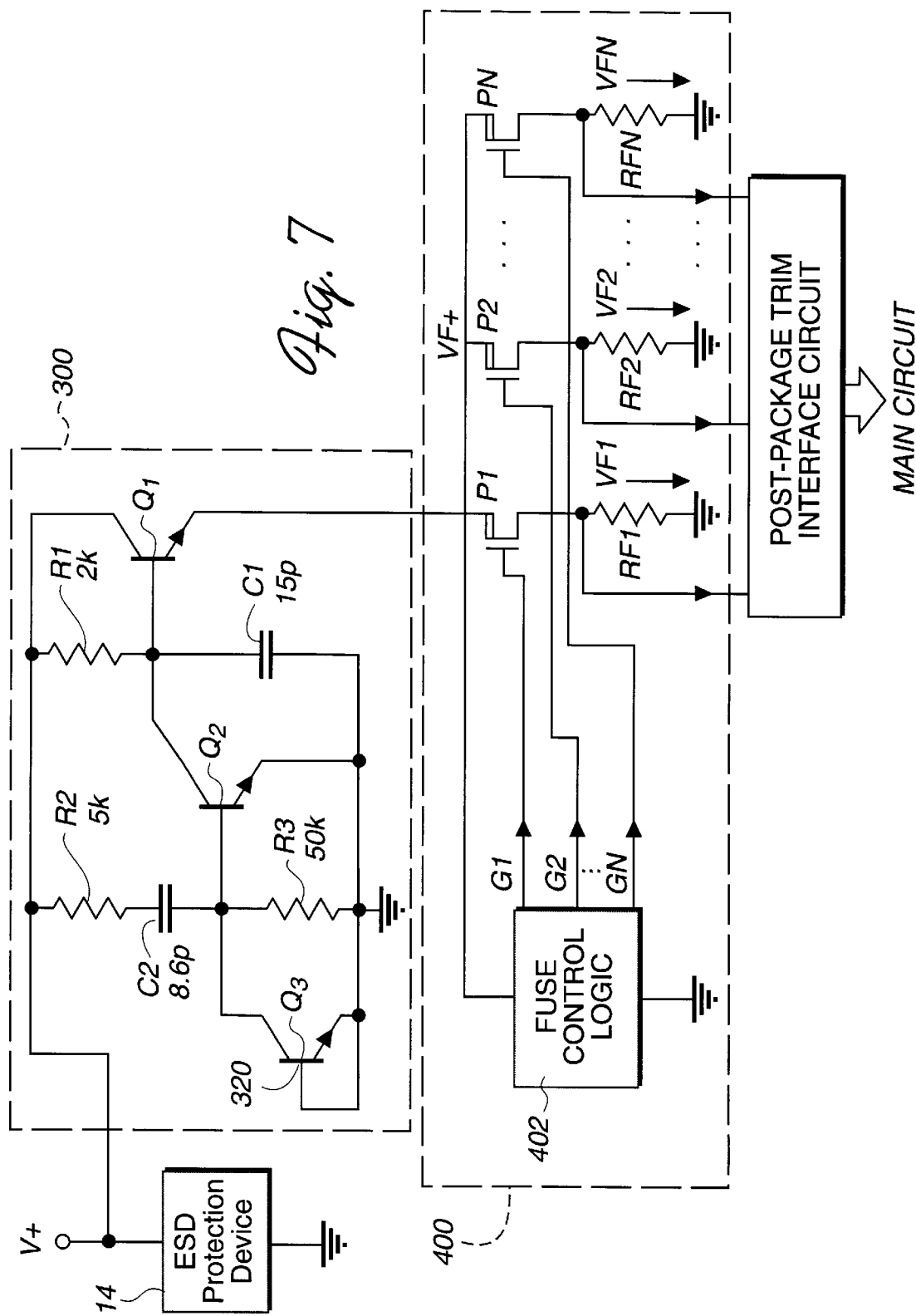
FIG. 7 is a schematic of an integrated circuit in accordance with yet another embodiment of the present invention, the integrated circuit including the second filter circuit of FIG. 6 and post-package trimming circuitry.

FIG. 7 illustrates the use of the filter circuit 300 of FIG. 6 with primary circuit 12 having a post-package trim circuit 400. In this embodiment, the post-package trim circuit 400 includes a fuse control logic device 402, a plurality of control wires G1 through GN, a plurality of PMOS transistors, and a plurality of thin film fuses having resistance values of $R_{f1}$ through $R_{fn}$.

As will be appreciated, the logic device 402 is operable to blow the fuses in order to adjust (i.e. trim) an output voltage of the primary circuit 12 even after the integrated circuit has been completely packaged. However, these fuses are extremely sensitive so that even the attenuated voltage pulse generated by an ESD event with the standard ESD protection devices can blow these fuses causing irreversible damage to the integrated circuit. But, the filtered voltage $V_{F+}$ produced when the filter circuit 300 is present is substantially smaller than $V_+$ and thus decreases the risk of damage to the post-package trim circuitry.

Although only a few embodiments of the present invention have been described in detail, it should be understood that the present invention may be embodied in many other specific forms without departing from the spirit or scope of the invention. While FIGS. 3 and 6–7 utilized the symbol normally associated with npn type transistors, the present invention contemplates embodiments utilizing other types of switches. By way of example, n-channel field effect transistors and even bi-polar transistors are suitable equivalents for the illustrated npn transistors. As will further be appreciated, the filter circuits of the present invention can be implemented with pnp transistors.

Therefore, the present examples and embodiments are to be considered as illustrative and not restrictive, and the invention is not to be limited to the details given herein, but may be modified within the scope of the appended claims.

I claim:

1. A filter circuit suitable for protecting primary circuitry from transient electrical pulses, the filter circuit comprising:

two resistors R1 and R2 each having first and second terminals;

two capacitors C1 and C2 each having first and second terminals;

a transistor Q1 having a base, a collector and an emitter, wherein voltage applied to the base of the transistor Q1 controls a flow of current through the transistor Q1 between the collector and the emitter of the transistor Q1;

a transistor Q2 having a base, a collector and an emitter, wherein voltage applied to the base of the transistor Q2 controls a flow of current through the transistor Q2 between the collector and the emitter of the transistor Q2, the emitter of the transistor Q2 being an output of the filter circuit; and wherein:

the first terminals of resistors R1 and R2 and the collector of transistor Q1 are electrically coupled, such electrical coupling being an input to the filter circuit;

the second terminal of the resistor R2 and the first terminal of the capacitor C2 are electrically coupled;

the second terminal of the capacitor C2 and the base of the transistor Q2 are electrically coupled;

the second terminal of the resistor R1, the collector of the transistor Q2, the first terminal of the capacitor C1, and the base of the transistor Q1 are electrically coupled; and the emitter of the transistor Q2 and the second terminal of the capacitor C1 are electrically coupled to a common ground reference to which the primary circuitry is also coupled, whereby a transient voltage pulse applied at the input of the filter circuit is filtered such that a voltage measured at the output of the filter circuit due to the transient voltage pulse is substantially less than the transient voltage pulse.

2. A filter circuit as recited in claim 1 wherein transistors Q1 and Q2 are npn transistors.

3. A filter circuit as recited in claim 1 wherein transistors Q1 and Q2 are n-channel field effect transistors.

4. A filter circuit as recited in claim 1 wherein transistors Q1 and Q2 are pnp transistors.

5. A filter circuit as recited in claim 1 further comprising:

a resistor R3 having first and second terminals;

a transistor Q3 having a base, a collector and an emitter, wherein voltage applied to the base of the transistor Q3 can control a flow of current through the transistor Q3 between the collector and the emitter of the transistor Q3; and wherein:

the first terminal of the resistor R3 and the emitter of the transistor Q3 are electrically coupled to the second terminal of the capacitor C2; and the base and the collector of the transistor Q3, the second terminal of the resistor R3, the emitter of the transistor Q2, and the second terminal of the capacitor C1 are all electrically coupled to a common ground reference.

6. A filter circuit as recited in claim 5 wherein the transistor Q3 is an npn transistor.

7. A filter circuit as recited in claim 5 wherein the transistor Q3 is an n-channel field effect transistor.

8. A filter circuit as recited in claim 1, wherein the filter circuit is integral to a integrated circuit package.

9. A filter circuit as recited in claim 8 wherein the integrated circuit package further includes an electrostatic discharge (ESD) protection device and a primary circuit, an input of the ESD protection device and the input of the filter circuit being electrically coupled, and the output of the filter circuit and an input of the primary circuit being electrically coupled, whereby the ESD protection device and the filter circuit work together to protect the primary circuit from transient voltage pulses.

10. A filter circuit as recited in claim 1 wherein the value of resistor $R_1$ is between about 500 ohms and 10 Kilo ohms, the value of resistor R2 is between about 1 Kilo ohm and 20 Kilo ohms, the value of the capacitor C1 is between about 2 picofarads and 25 picofarads, and the value of the capacitor C2 is between about 5 picofarads and 20 picofarads, whereby the filter circuit is suitable for protecting primary circuitry from electrostatic discharge events that are shorter than 300 nanoseconds.

11. A filter circuit as recited in claim 1 wherein the value of the resistor R1 being about 2 Kilo ohms, the value of the resistor R2 being about 5 Kilo ohms, the value of the capacitor C1 being about 15 picofarads, and the value of the capacitor C2 being about 8.6 picofarads.

12. A filter circuit as recited in claim 1 wherein the turn-on time of the transistor $Q_2$ is less than the time constant $R_1$ multiplied by $C_1$.

13. A filter circuit as recited in claim 1 wherein the time constant $R_2$ multiplied by $C_2$ is large enough to render and maintain $Q_2$ saturated through a transient voltage pules greater than 50 Volts and having a duration greater than 200 nanoseconds.

14. A filter circuit suitable for protecting primary circuitry from transient electrical pulses, the filter circuit comprising:

three resistors R1, $R_2$ and $R_3$ each having first and second terminals;

two capacitors C1 and C2 each having first and second terminals;

a transistor Q1 having a base, a collector and an emitter, wherein voltage applied to the base of the transistor Q1 can control a flow of current through the transistor Q1 between the collector and the emitter of the transistor Q1;

a transistor Q2 having a base, a collector and an emitter, wherein voltage applied to the base of the transistor Q2 can control a flow of current through the transistor Q2 between the collector and the emitter of the transistor Q2, the emitter of the transistor Q2 being an output of the filter circuit; and wherein:

the first terminals of resistors R1 and R2and the collector of transistor Q1 are electrically coupled, such electrical coupling being an input to the filter circuit;

the second terminal of the resistor R2 and the first terminal of the capacitor C2 are electrically coupled;

the second terminal of the capacitor C2, the base of the transistor Q2, and the first terminal of the resistor $R_3$ are electrically coupled;

the second terminal of the resistor R1, the collector of the transistor Q2, the first terminal of the capacitor C1, and the base of the transistor Q1 are electrically coupled;

the emitter of the transistor Q2 and the second terminal of the capacitor C1 are electrically coupled to; and the second terminal of the resistor $R_3$ is electrically coupled to a ground reference, whereby a transient voltage pulse applied at the input of the filter circuit is filtered such that a voltage measured at the output of the filter circuit due to the transient voltage pulse is substantially less than the transient voltage pulse.

15. A filter circuit as recited in claim 14 wherein the transistors $Q_1$ and $Q_2$ are npn transistors.

16. A filter circuit as recited in claim 14 wherein the transistors $Q_1$ and $Q_2$ are n-channel field effect transistors.

17. A filter circuit as recited in claim 14 wherein the transistors $Q_1$ and $Q_2$ are pnp transistors.

18. A filter circuit as recited in claim 14 wherein the filter circuit is integral to an integrated circuit package.

19. A filter circuit as recited in claim 18 wherein the integrated circuit package further includes an electrostatic discharge (ESD) protection device and a primary circuit, an input of the ESD protection device and the input of the filter circuit being electrically coupled, and the output of the filter circuit and an input of the primary circuit being electrically coupled, whereby the ESD protection device and the filter circuit work together to protect the primary circuit from transient voltage pulses.

20. An integrated circuit package comprising:

a conductive lead arranged to provide an electrically conductive path from a first point external to the integrated circuit package to a second point internal to the integrated circuit package;

an electrostatic discharge (ESD) protection device coupled in series between the conductive lead and a ground reference, the ESD device operable to limit the voltage magnitude of a transient electrical pulse occurring upon the conductive lead;

a primary circuit integral to the integrated circuit package; and a filter circuit having an input and an output, the filter circuit input being electrically coupled to the conductive lead and the filter circuit output being electrically coupled to an input of the primary integrated circuit, the filter circuit operable such that the voltage magnitude of an electrical signal generated at the filter circuit output in response to the certain transient electrical pulse is less than the voltage magnitude of the certain transient electrical pulse, the filter circuit including:

two resistors R1 and R2 each having first and second terminals:

two capacitors C1 and C2 each having first and second terminals;

a transistor Q1 having a base, a collector and an emitter, wherein voltage applied to the base of the transistor Q1 can control a flow of current through the transistor Q1 between the collector and the emitter of the transistor Q1;

a transistor Q2 having a base, a collector and an emitter, wherein voltage applied to the base of the transistor Q2 can control a flow of current through the transistor Q2 between the collector and the emitter of the transistor Q2, the emitter of the transistor Q2 being the filter circuit output; and wherein:
the first terminals of resistors R1 and R2 and the collector of transistor Q1 are electrically coupled, such electrical coupling being the filter circuit input;
the second terminal of the resistor R2 and the first terminal of the capacitor C2 are electrically coupled;
the second terminal of the capacitor C2 and the base of the transistor Q2 are electrically coupled;
the second terminal of the resistor R1, the collector of the transistor Q2, the first terminal of the capacitor C1, and the base of the transistor Q1 are electrically coupled; and
the emitter of the transistor Q2 and the second terminal of the capacitor C1 are electrically coupled,
whereby the primary circuit is provided protection from the transient electrical pulse.

21. An integrated circuit package as recited in claim 20 wherein the transistors $Q_1$ and $Q_2$ are npn transistors.

22. An integrated circuit package as recited in claim 20 wherein the transistors $Q_1$ and $Q_2$ are n-channel field effect transistors.

23. An integrated circuit package as recited in claim 20 further including a resistor $R_3$ having first and second terminals, the first terminal of the resistor $R_3$ and the base of the transistor $Q_2$ being electrically coupled, and the second terminal of the resistor $R_3$ electrically coupled to the ground reference.

24. An integrated circuit package as recited in claim 23 further including a transistor $Q_3$ having a base, an emitter, and a collector, the base and the collector of the transistor $Q_3$ being electrically coupled to the ground reference, and the emitter of the transistor $Q_3$ being electrically coupled to the first terminal of the resistor $R_3$.

25. An integrated circuit package as recited in claim 20 wherein the primary circuitry includes post-package trimming circuitry.

26. An integrated circuit package as recited in claim 25 wherein the post-package trimming circuitry includes a plurality of thin film fuses that may be selectively blown in order to alter the electrical characteristics of the integrated circuit package.

* * * * *